United States Patent

[11] 3,618,741

| [72] | Inventor | Siegfried Berndt |
| | | Solingen, Germany |
| [21] | Appl. No. | 876,821 |
| [22] | Filed | Nov. 14, 1969 |
| [45] | Patented | Nov. 9, 1971 |
| [73] | Assignee | Th. Kieserling & Albrecht |
| | | Solingen, Germany |
| [32] | Priority | Nov. 15, 1968 |
| [33] | | Germany |
| [31] | | P 18 09 152.6 |

[54] APPARATUS FOR MANIPULATING HEAVY WORKPIECES
9 Claims, 4 Drawing Figs.

[52] U.S. Cl. .................................................. 198/26
[51] Int. Cl. .................................................. B65g 47/04
[50] Field of Search .................................... 198/26, 27; 214/1 PB

[56] References Cited
UNITED STATES PATENTS
| 2,880,844 | 4/1959 | Vogeli | 198/26 |
| 2,961,729 | 11/1960 | Colliua | 214/1 PB |

Primary Examiner—Edward A. Sroka
Attorney—Michael S. Striker

ABSTRACT: The foremost workpiece of a series of elongated heavy workpieces resting on an inclined support is transferred onto a conveyor by a transfer unit which comprises a series of straps surrounding eccentrics and having sockets at their upper ends and elongated extension at their lower ends. The extension slide in tubular holders mounted to pivot about an axis which is parallel to the drive shaft for the eccentrics whereby the sockets lift the foremost workpiece and transport it along an arcuate path toward and onto the conveyor while the extensions pivot with and slide relative to their holders in response to rotation of the eccentrics.

3,618,741

APPARATUS FOR MANIPULATING HEAVY WORKPIECES

BACKGROUND OF THE INVENTION

The present invention relates to apparatus for manipulating bars, rods, billets, blooms or like elongated workpieces. More particularly, the invention relates to improvements in apparatus which is capable of serially transferring heavy elongated workpieces at desired intervals and in such a way that each transferred workpiece is located in an optimum position for further treatment. For example, the apparatus of the present invention can be employed to feed workpieces to or to remove treated workpieces from a shaving machine for tubular or solid rod-shaped metallic stock.

Apparatus which are used for transfer of metallic pipes or bars to or from shaving machines normally comprise a system of articulated arms or levers which carry out the actual transfer and a mechanism which delivers discrete workpieces to the arms. Such apparatus are satisfactory for manipulation of lightweight or medium-weight workpieces but are not capable of transferring heavy workpieces without causing at least some misalignment of workpieces which are ready for transfer. If the workpieces awaiting transfer are stored on an inclined support, they are likely to roll subsequent to removal of a workpiece and to deform or break the transfer mechanism. Such apparatus are disclosed, for example, in German Pat. No. 970,427.

Certain other types of known transfer apparatus employ shock absorbers which intercept rolling workpieces and must be disengaged from workpieces prior to each transfer. Such mounting of shock absorbers involves considerable expenses and maintenance cost.

SUMMARY OF THE INVENTION

An object of the invention is to provide a relatively simple, compact, rugged and reliable apparatus which can be utilized for transfer of lightweight, medium-weight as well as extremely bulky and heavy elongated workpieces and wherein uncontrolled movements of workpieces during transfer and of workpieces awaiting transfer are prevented in a simple, material- and space-saving manner.

Another object of the invention is to provide an apparatus which can transfer bulky and/or heavy elongated workpieces from a first to a second support or vice versa and which can transfer workpieces automatically or in response to operation of manual controls and at greater or shorter intervals.

A further object of the invention is to provide a transfer apparatus which can be combined with or incorporated into existing processing machines for tubes, bars, rods or analogous workpieces.

An additional object of the invention is to provide a transfer apparatus wherein the workpieces are treated gently, wherein the workpieces need not be intercepted by shock absorbers, which can transfer workpieces through greater or shorter distances, and which is lighter, more compact and less expensive than presently known apparatus for transfer of similar goods.

The invention is embodied in an apparatus for transferring elongated workpieces, particularly for transferring heavy rod-shaped metallic workpieces. The apparatus comprises a pair of supports one of which is arranged to accommodate a supply of elongated workpieces, preferably side-by-side so that the workpieces extend in a predetermined direction and that one of the workpieces dwells in a predetermined position ready for transfer onto the other support, and a transfer unit including at least one transfer member which is located between the two supports and is pivotable about and movable at right angles to an axis which is parallel to the aforementioned direction. The transfer member comprises a work-engaging portion which is remote from the axis and the transfer unit further comprises drive means (preferably including one or more eccentrics rotatable about ab axis which is parallel to the aforementioned axis) serving to impart to the transfer member recurrent movements about and relative to the first-mentioned axis. During each such movement, the work-engaging portion of the transfer member engages and lifts the one workpiece off the one support and transports such workpiece along an arcuate path toward and onto the other support. The transfer member preferably comprises an elongated extension which is reciprocable in a holder mounted for pivotal movement about the first-mentioned axis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
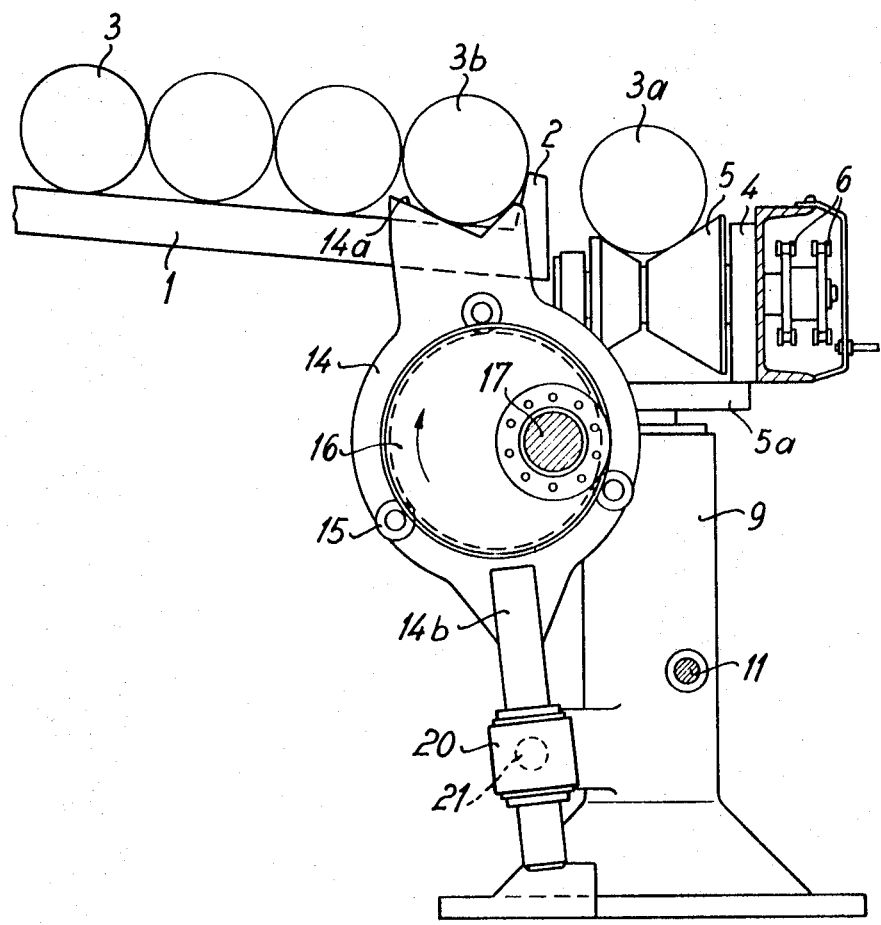
FIG. 1 is a transverse vertical sectional view of an apparatus which embodies the invention, one of the transfer members being shown in starting position.
Figure 4:
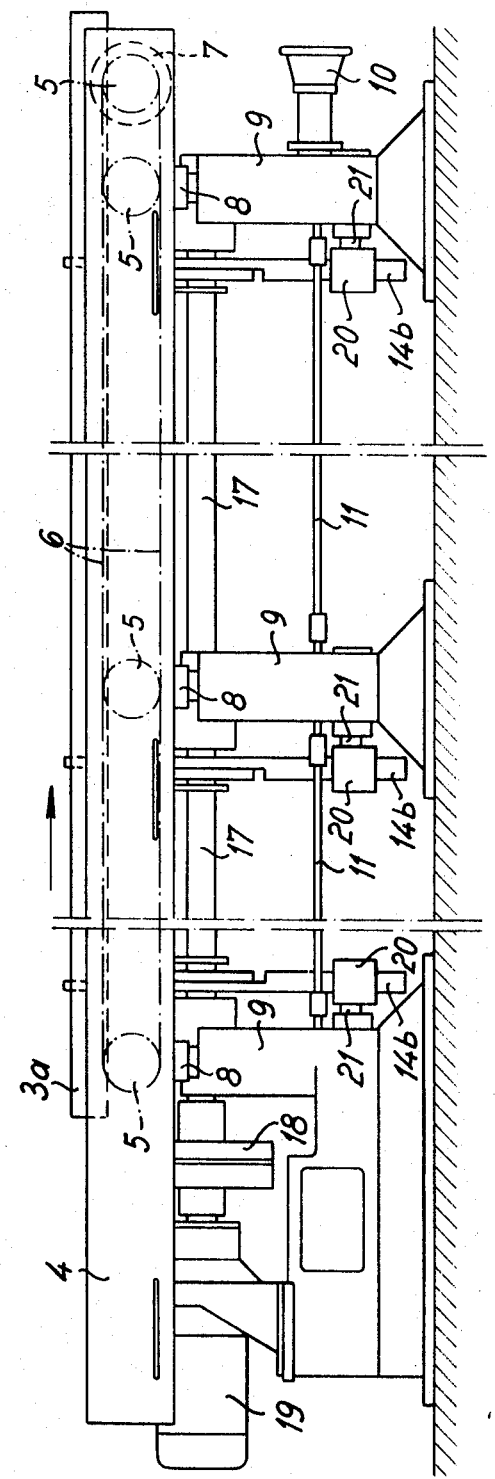
FIG. 4 is a smaller scale side elevational view of the apparatus as seen from the right-hand side of FIG. 1.

Referring first to FIGS. 1 and 4, there is shown an apparatus which includes two supports for elongated rod-shaped workpieces 3 and a transfer unit which serves to transport successive workpieces from one of the supports onto the other support. The support from which the workpieces are being removed includes an inclined grate 1 having at its lower end an adjustable stop 2 to intercept the foremost workpiece 3b in a predetermined position. The support 4 which receives successive workpieces is a conveyor having a row of driven profiled rolls 5 which serve to advance the workpieces lengthwise, for example, into the range of the revolver head of a rod-shaving machine of any known design. The workpieces 3 are assumed to consist of metallic material and to be of at least substantially cylindrical shape so that they tend to roll toward the adjustable stop 2 of the grate 1. The rolls 5 of the conveyor 4 are driven by an electric motor 7 or another suitable prime mover through the intermediary of one or more chains or belts 6. The shafts of the rolls 5 are mounted in brackets 5a carried by upright columns 8 which are movable up and down in cylindrical guides 9. The means for moving the columns 8 with reference to their guides 9 comprises a hand wheel 10 which can rotate a horizontal shaft 11. The latter is provided with pinions (not shown) mating with racks on the columns 8 so that all of the columns can be moved as a unit, either up or down, to place the rolls 5 into an optimum position for reception of workpieces 3. As a rule, workpieces of greater or smaller diameter should be transferred in such a way that their axes are located in a predetermined plane. The handwheel 10 enables the operators to properly adjust the rolls 5 in order to insure that the axis of a workpiece on the conveyor 4 is always located in such a plane, irrespective of the diameters of the workpieces. It is clear that the columns 8 can be provided with external threads to constitute spindles and that the shaft 11 can rotate spindle nuts provided in the guides 9 and serving to effect vertical movement of the spindles and rolls 5 in response to rotation of the hand wheel 10.

Figure 3:
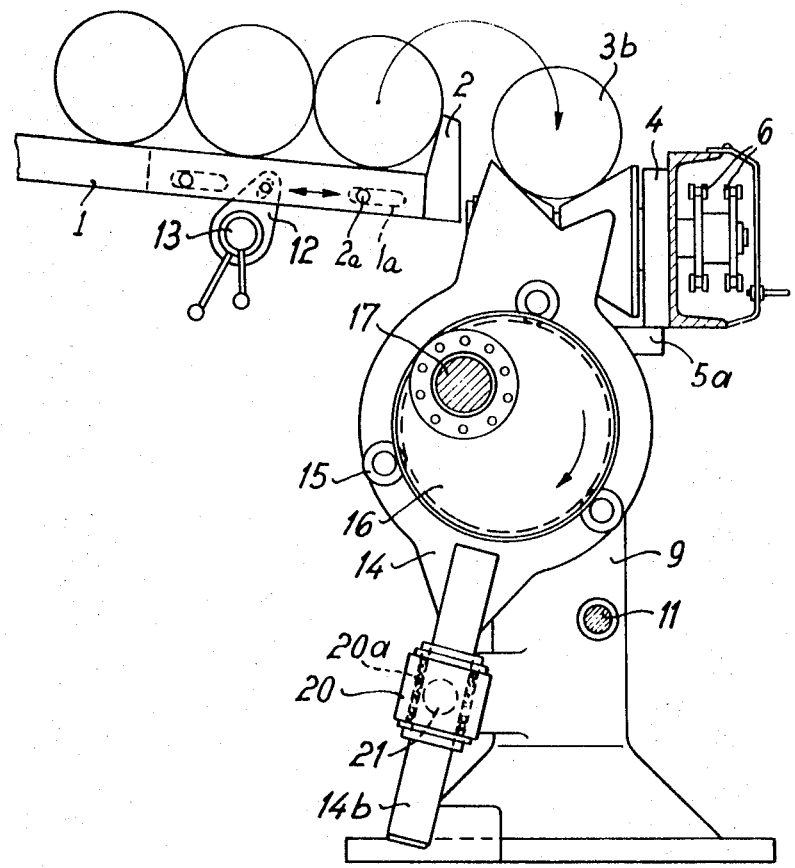
FIG. 3 is a similar sectional view but showing one of the transfer members in a position it assumes when the transfer of a workpiece is completed.

As shown in FIG. 3, the stop 2 of the grate 1 has pins 2a which are slidable in slots 1a provided in the platform of the grate 1. An arm 12 is coupled to the stop 2 and is pivotable about a horizontal shaft 13 to move the stop toward or away from the rolls 5. A locknut or the like is provided to fix the arm 12 in selected position. The stop 2 is adjustable for the purpose of insuring satisfactory transfer of smaller or larger diameter workpieces.

The transfer unit includes one but preferably two or more transfer members 14 each of which has a strap surrounding an eccentric 16. The periphery of each eccentric 16 is formed with a track for a set of roller followers 15 on the respective transfer member 14. Each transfer member is provided at its upper end with a work-engaging socket 14a wherein a workpiece rests during transfer from the grate 1 onto the rolls 5 of the conveyor 4. In the illustrated embodiment, the sockets 14a are provided with two prongs flanking a substantially V-shaped recess.

The drive means for moving the transfer members 14 in such a way that their sockets 14a travel along substantially circular paths includes the aforementioned eccentrics 16, a shaft 17 for such eccentrics, and a prime mover 19 (e.g., a variable speed reversible electric motor) which drives the shaft 17 through the intermediary of a clutch 18. The lower portions 14b of the transfer members 14 constitute downwardly projecting extensions 14b (located substantially diametrically opposite the sockets 14a with reference to the centers of the respective straps) and passing though friction-reducing sleeves 20a provided in holders 20 which are rockable on pivots 21 mounted on the guides 9. The axes of the pivots 21 are parallel to the shaft 17 and each sleeve 20a preferably consists of antifriction rolling elements mounted in the corresponding holder 20.

Figure 2:
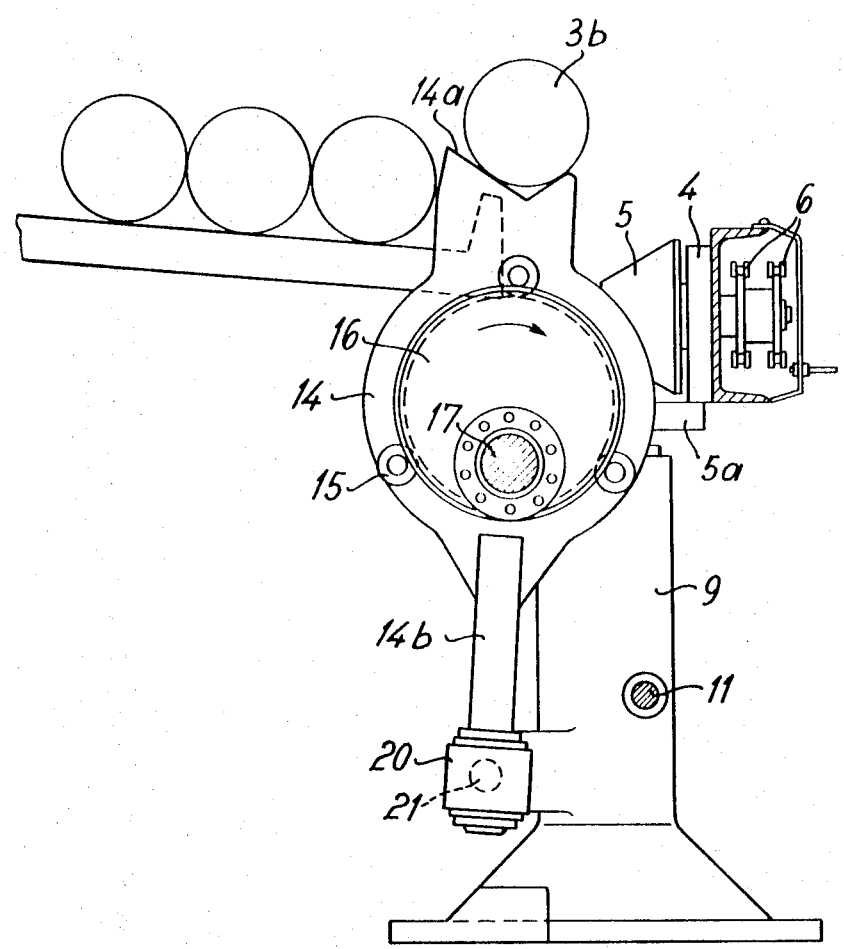
FIG. 2 is a similar sectional view but showing one of the transfer members in an intermediate position during transfer of a heavy workpiece.

The operation:

FIG. 4 shows that a workpiece 3a is supported by the rolls 5 of the conveyor 4. This workpiece is assumed to be fed axially so that it passes through and is treated by the revolving head of a shaving machine which includes the conveyor 4. Once the trailing end of the workpiece 3a is moved out of the way, such workpiece produces a signal (e.g., by actuating a limit switch, by energizing a photosensitive receiver or in any other suitable way) which is used to start the motor 19. The latter drives the shaft 17 by way of the clutch 18 so that the eccentrics 16 begin to leave their starting positions (FIG. 1) and cause the sockets 14a of the corresponding transfer members 14 to lift the foremost workpiece 3b above and away from the stop 2 by moving such workpiece along an arcuate path indicated in FIG. 3. FIG. 2 illustrates one of the transfer members 14 in an intermediate position in which the socket 14a maintains the workpiece 3b at a level above the stop 2. The sockets 14a then begin to descend and gently deposit the workpiece 3b on the rolls 5 (FIG. 3). The extensions 14b slide in and pivot with the holders 20 to insure that the sockets 14a travel along a predetermined path. The motor 19 is preferably arrested in a fully automatic way as soon as each of the eccentrics 16 completes a full revolution. Thus, the transfer members 14 return to the starting positions (FIG. 1) and are ready to lift the next workpiece as soon as the motor 19 is started again.

As shown in FIG. 2, the raised sockets 14a of the transfer members 14 hold the foremost workpiece on the grate 1 against rapid rolling toward the stop 2 so that the latter need not be provided with shock absorbers. Thus, the movement of the foremost workpiece into engagement with the stop is controlled by the transfer member to avoid overstressing of the grate. This permits for utilization of a lighter and hence less expensive grate. Also, the rolls 5 of the conveyor 4 are not subjected to excessive stresses because the drive including the eccentrics 16 cooperates with the holders 20 to control the movements of transfer members 14 in which a way that each workpiece is gently deposited on the rolls 5 and thereupon moves its socket 14a out of the way to permit lengthwise transport of a workpiece on the conveyor 4 without any or with minimal delay.

It is clear that the improved apparatus is susceptible of many modifications without departing from the spirit of my invention. For example, if the conveyor 4 serves to receive shaved workpieces, the direction of rotation of the motor 19 can be reversed so that the workpieces are transferred from the rolls 5 onto the grate 1 or onto a grate which slopes downwardly to insure that each freshly transferred workpiece is free to roll away from the transfer station. Also, the grate 1 can be replaced with a second conveyor which can but need not be identical with the conveyor 4.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended.

I claim:

1. Apparatus for transferring elongated workpieces, particularly for transferring heavy rod-shaped workpieces, comprising a pair of supports one of which is arranged to accommodate a supply of workpieces so that one of the workpieces extends in a predetermined direction and dwells in a predetermined position and the other of which is arranged to receive successive workpieces; and a transfer unit including at least one transfer member located between said supports, said transfer member being pivotable about and movable at right angles to an axis which is parallel to said direction and having a work-engaging portion remote from said axis, and drive means for imparting to said transfer member recurrent movements during each of which said transfer member moves about and relative to said axis whereby said work-engaging portion engages and lifts the one workpiece off said one support and transports such workpiece along an arcuate path toward and onto said other support, said drive means comprising an eccentric rotatable about an axis which is parallel to said first-mentioned axis and said transfer member further having a strap surrounding said eccentric.

2. Apparatus as defined in claim 1, wherein said strap is provided with followers in rolling engagement with said eccentric.

3. Apparatus as defined in claim 1, wherein said transfer member further comprises an elongated extension and further comprising holder means pivotable about said first-mentioned axis and reciprocably receiving said extension.

4. Apparatus as defined in claim 3, wherein said work-engaging portion is located substantially diametrically opposite said extension with reference to the center of said strap.

5. Apparatus as defined in claim 3, further comprising friction reducing means interposed between said holder means and said extension.

6. Apparatus as defined in claim 1, wherein at least one of said supports comprises a conveyor which is arranged to advance the workpieces lengthwise.

7. Apparatus as defined in claim 1, wherein said one support is a grate which is inclined so that the workpieces thereon tend to roll and wherein said grate includes stop means positioned to locate the foremost workpiece on said grate in said predetermined position.

8. Apparatus as defined in claim 1, wherein one of said supports forms part of a rod-shaving machine.

9. Apparatus as defined in claim 1, wherein said transfer unit comprises a plurality of transfer members and said drive means is arranged to move said transfer members in unison.

* * * * *